(12) United States Patent
Chanderraju et al.

(10) Patent No.: US 9,338,508 B2
(45) Date of Patent: May 10, 2016

(54) PRESERVING A CONSUMPTION CONTEXT FOR A USER SESSION

(71) Applicant: GOOGLE TECHNOLOGY HOLDINGS LLC, Mountain View, CA (US)

(72) Inventors: Varma L. Chanderraju, San Jose, CA (US); Bhavan Gandhi, Vernon Hills, IL (US); Vinay Kalra, San Jose, CA (US); Sridhar Kunisetty, Fremont, CA (US); Sanjeev K. Mishra, Sunnyvale, CA (US); Bharath R. Rao, Santa Clara, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 45 days.

(21) Appl. No.: 13/657,943

(22) Filed: Oct. 23, 2012

(65) Prior Publication Data

US 2014/0115031 A1     Apr. 24, 2014

(51) Int. Cl.

| G06F 15/16 | (2006.01) |
| H04N 21/45 | (2011.01) |
| H04N 5/76 | (2006.01) |
| H04N 21/258 | (2011.01) |
| H04N 21/433 | (2011.01) |

(Continued)

(52) U.S. Cl.
CPC ............. *H04N 21/4532* (2013.01); *H04N 5/76* (2013.01); *H04N 21/25866* (2013.01); *H04N 21/4333* (2013.01); *H04N 21/43615* (2013.01); *H04N 21/8455* (2013.01); *H04W 4/206* (2013.01); *H04N 5/765* (2013.01)

(58) Field of Classification Search
CPC ... H04L 67/16; H04N 21/25866; H04N 21/43
USPC ......... 709/203, 204, 205, 217, 219, 227, 231, 709/232, 248, 247
See application file for complete search history.

(56) References Cited

U.S. PATENT DOCUMENTS

| 7,890,599 B2 | 2/2011 | Kalmanje et al. |
| 8,046,438 B2 | 10/2011 | Martinez et al. |

(Continued)

OTHER PUBLICATIONS

Final Rejection for U.S. Appl. No. 13/657,955, Oct. 28, 2015.

(Continued)

*Primary Examiner* — Liangche A Wang
*Assistant Examiner* — Ayele Woldemariam
(74) *Attorney, Agent, or Firm* — Lowenstein Sandler LLP

(57) ABSTRACT

Continuity of an entire user session (including the primary content stream, secondary content streams, and user context) is preserved so that the user can resume the session at a later time, at a different place, and, possibly, using different equipment. When a user pauses a session, the context of that session is automatically preserved. Upon resumption, the session begins where the user left off, resuming the primary media stream at the point where the user stopped, knowing what secondary content items the user has already seen, and re-establishing any user-set parameters for the session (e.g., playback volume, allocation of streams to particular screen real estate, whether closed captioning is turned on, and the like). For time-shifted content consumption, the system intelligently selects, filters, and processes contextual information (such as characteristics of the primary media) in order to present companion streams that are relevant and engaging to the user.

18 Claims, 6 Drawing Sheets

(51) Int. Cl.
H04N 21/436 (2011.01)
H04N 21/845 (2011.01)
H04W 4/20 (2009.01)
H04N 5/765 (2006.01)

(56) References Cited

U.S. PATENT DOCUMENTS

| | | | |
|---|---|---|---|
| 8,356,123 | B2 | 1/2013 | Cooper et al. |
| 8,392,501 | B2 | 3/2013 | Foti |
| 2008/0133529 | A1 | 6/2008 | Berkowitz et al. |
| 2010/0235321 | A1 | 9/2010 | Shukla et al. |
| 2011/0010774 | A1 | 1/2011 | Park |
| 2011/0082735 | A1* | 4/2011 | Kannan et al. ............. 705/14.23 |
| 2011/0246659 | A1* | 10/2011 | Bouazizi ........................ 709/231 |
| 2011/0307558 | A1* | 12/2011 | Romano et al. ............... 709/205 |
| 2012/0078997 | A1 | 3/2012 | Evans et al. |
| 2012/0324491 | A1 | 12/2012 | Bathiche et al. |
| 2013/0111529 | A1 | 5/2013 | Yao et al. |

OTHER PUBLICATIONS

Non-Final Rejection for U.S. Appl. No. 13/657,955, Jun. 5, 2015.
Final Rejection for U.S. Appl. No. 13/657,955, Nov. 26, 2014.
Non-Final Rejection for U.S. Appl. No. 13/657,955, Jul. 16, 2014.

\* cited by examiner

PRESERVING A CONSUMPTION CONTEXT FOR A USER SESSION

CROSS-REFERENCE TO RELATED APPLICATIONS

The present application is related to U.S. patent application Ser. No. 13/657,955, filed on Oct. 23, 2012.

TECHNICAL FIELD

The present disclosure is related generally to digital delivery of media content.

BACKGROUND

As personal communications devices (e.g., smartphones) are developed to support greater and greater functionality, people are using them to do much more than talk. As is well known, these devices now usually allow their users to create media files (e.g., by taking a picture or by recording a video using a camera on the device), to download and view media files from remote servers (via a web interface supported by the device), and to access interactive applications.

However, even as people spend more time online, traditional media remain very important. Indeed, rather than simply replacing traditional media time with online time, many people (more than 30% of television viewers as of mid-2012, according to survey data) are beginning to "multi-task," that is, to combine traditional and new media. For example, while a user watches television, his personal communications device becomes a "companion device" displaying content often, but not always, related to the content shown on the television. This user may engage in an interactive application (e.g., check his e-mail) on the companion device while at the same time remaining at least peripherally aware of the content that the television is displaying.

Today there are several products that allow television viewers to consume and to create "secondary" content that is related to the television program (i.e., the "primary content") that they are watching. A service produces a synchronized feed of television programming and related web articles, websites, tidbits, etc., for display on a companion device (or on a second window on the television screen). The feed may be generated automatically using some preliminary analysis of closed-caption text and television-programming information (e.g., information from an electronic program guide). Other products allow users to enter comments at specific points within a TV program. These comments are then presented to other users when they are watching the same program.

Various emerging technologies free a viewer from having to watch primary content at a fixed location (e.g., in his living room where the television sits) or at fixed times scheduled by providers of the primary content. The viewer can now "time-shift" and "place-shift" his viewing, watching primary and related secondary content whenever he wishes, on whatever device he chooses, and at any time he wishes.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
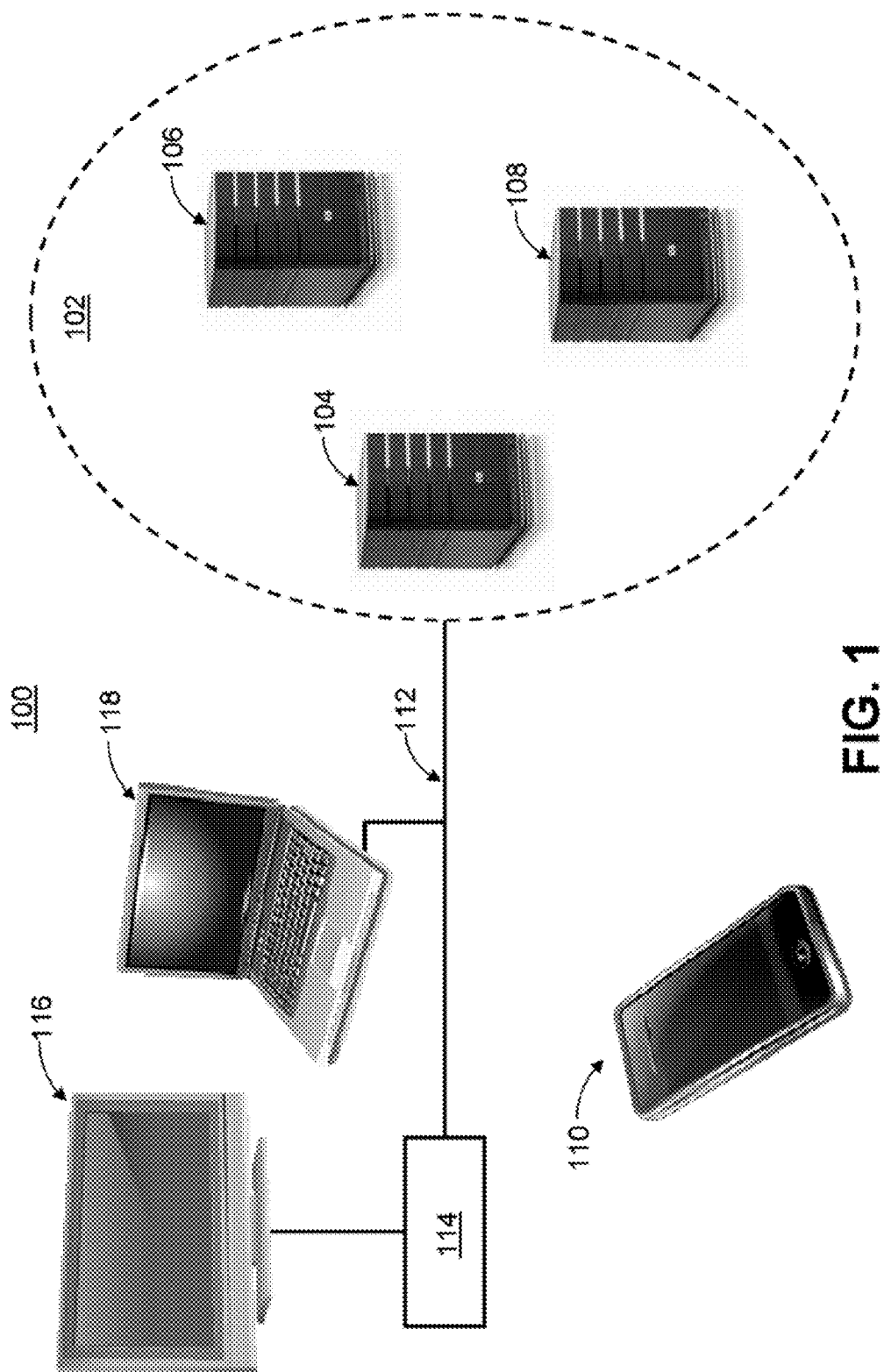
FIG. 1 is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

According to aspects of the present disclosure, continuity of an entire user session (including the primary content stream, secondary content streams, and user context) is preserved so that the user can resume the session at a later time, at a different place, and, possibly, using different equipment. When a user pauses a session, the context of that session is automatically preserved. Upon resumption, the session begins where the user left off, resuming the primary media stream at the point where the user stopped, knowing what secondary content items the user has already seen, and re-establishing any user-set parameters for the session (e.g., playback volume, allocation of streams to particular screen real estate, whether closed captioning is turned on, and the like).

Resumption of the session involves more than simply knowing where in a media stream the user was when the session paused. For time-shifted content consumption, the system intelligently selects, filters, and processes contextual information (such as characteristics of the primary media) in order to present companion streams that are relevant and engaging to the user.

As a first example, consider resuming a previously paused sit-com (the primary stream). Relevant secondary streams, such as social-networking feeds, can be processed, compressed, or re-arranged to highlight parts of the sit-com that achieved the most resonance with previous viewers. Certain other streams, such as a parallel feed that provides contextual information on locales depicted in the sit-com, can be synchronized to maintain relevance to the associated primary media stream.

As a second example, consider a user session in which the primary media content was, when the user paused it, "live," e.g., a baseball game. Upon resumption of the session, relevant secondary streams that could disclose the outcome (spoiler content) are deferred. Secondary streams are analyzed to discern the salient moments or individuals in the game, and that analysis is used to focus the viewer's attention on those moments and individuals.

In addition to television programming and social-networking feeds, the primary and secondary content streams can include any possible type of content including a movie, a segment of video, a music video, an audio program, a segment of audio, a song, a metadata source, a game display, a map, a menu, a personal message, a public-service message, a service alert, an advertisement, a health-service recommendation, a web page, an e-mail message, a purchase recommendation, and a routing recommendation.

To understand these concepts more fully, first consider the representative communications environment 100 of FIG. 1. Connected together via any or all of various known networking technologies 102 are media-content servers 104 (e.g., television programming servers, web servers, and the like), companion-feeds servers 106, and context-preservation servers 108. (The functions of these servers 104, 106, 108 are discussed below.) Some of the media-content servers 104 may head-end a cable-television delivery system 112. For ease of illustration, only three servers 104, 106, 108 are shown, but numerous servers 104, 106, 108 can exist and can work together, as discussed below.

Head-end servers 104 provide, via the networking technologies 102, media-download and television services to end-user devices. Non-wireless end-user devices are supported by "wireline" network technologies (e.g., fiber, wire, and cable) 112. For example, a set-top box 114 generally receives television programming from a head-end server 104 and provides a user interface (e.g., an interactive program guide) for selecting and viewing content from the head-end server 104. A digital video recorder (not shown) can store programming for later viewing. The video content may be viewed on a television monitor 116. In some situations, a laptop computer 118 accesses web-based services either wirelessly or via the wireline network 112. A gaming console, home gateway, kiosk, digital sign, or media-restreaming device (not shown) are other possible end-user devices. Options for connecting these devices and services are well known in the art and need not be further discussed.

(A media-restreaming device transfers content between disparate types of networks. For example, it receives content from the cable system 112 and then transmits that content over a local radio link such as WiFi to a smartphone 110. The media-restreaming device usually operates in both directions to carry messages between the networks. In some embodiments, aspects of the present invention are practiced by a media-restreaming device.)

Television programming (and other media content) can also be delivered to non-traditional subscriber devices such as the smartphone 110. This smartphone 110 communicates wirelessly to a wireless base station (not shown but known in the art) to access the public switched telephone network, the Internet, or other networks to access web-based services as well as the television-delivery services provided by the media-content providers 104.

Wireless and wireline network technologies generally support two-way traffic: Media content and related information are delivered to the end-user devices 110, 114, 116, 118, and requests and other information go "up" to the servers 104, 106, 108.

The companion-feeds server 104 and context-preservation server 108 need not be stand-alone servers as depicted in FIG. 1 but can be functionally embodied on any number of computing devices including the set-top box 114, a personal communications device, the television 116, the mobile telephone 110, a personal digital assistant, the personal computer 118, a tablet computer, a gaming console, a media-restreaming device, and a plurality of servers.

Figure 2:
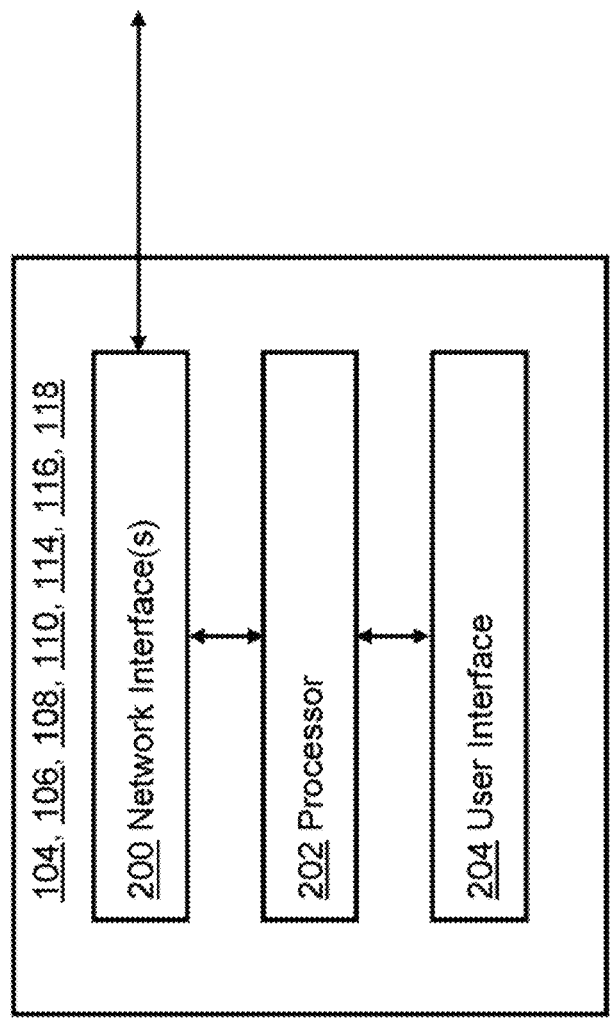
FIG. 2 is a generalized schematic of some of the devices shown in FIG. 1.

FIG. 2 shows the major components of a representative media-content server 104, companion-feeds server 106, context-preservation server 108, or end-user device 110, 114, 116, 118. Communications interfaces (also called transceivers) 200 send and receive primary and secondary content items, related information, and download requests. A processor 202 controls the operations of the device and, in particular, supports aspects of the present invention as illustrated in FIGS. 3 through 6, discussed below. The user interface 204 supports a user's (or administrator's) interactions with the device. Specific uses of these components by specific devices are discussed as appropriate below.

The flowcharts of FIGS. 3 through 6 show how the elements depicted in the communications environment 100 above work together to preserve and restore a user session.

Before invoking the preservation method of FIG. 3, consider again the user, in the communications environment 100 of FIG. 1, watching a baseball game on the television monitor 116. (The game is the primary content stream.) To enhance the user's experience, other content, in some manner related to the game, is presented to the user. (These are the secondary content streams.) For example, when a baseball batter approaches the plate, a display of his recent batting statistics could be retrieved from the web and presented to the user. By finding and presenting the secondary content automatically, the user's viewing of the primary content is enhanced without forcing him to remove his attention from the primary content in order to search for secondary content.

To find relevant secondary content, a "secondary content-selection process" analyzes the television program (possibly before the program is delivered to the user or possibly in real time) for topics that may be of interest to the user. For example, the process may look at closed-caption text associated with the primary content to know who will bat next, or it may analyze the video or accompanying audio itself to find topics related to the primary content. The topics can then be used as search terms for finding secondary content on websites.

Once the relevant secondary content items are found, they can be presented to the user either on a window (or "picture-in-picture") on the television monitor 116 or on a companion device that the user has with him, such as the smartphone 110, the laptop 118, a tablet computer, etc. Examples in the present discussion usually assume that the user is watching primary content on the television monitor 116 and possibly interacting with it through the set-top box 114. At least occasionally, some of the user's attention is also given to secondary content items displayed on his smartphone 110.

In many embodiments, the primary and second content streams are coordinated by a companion-feeds server 106. This server 106 may find appropriate secondary content related to the primary content and send it to the user's smartphone 110 at appropriate times.

Figure 3:
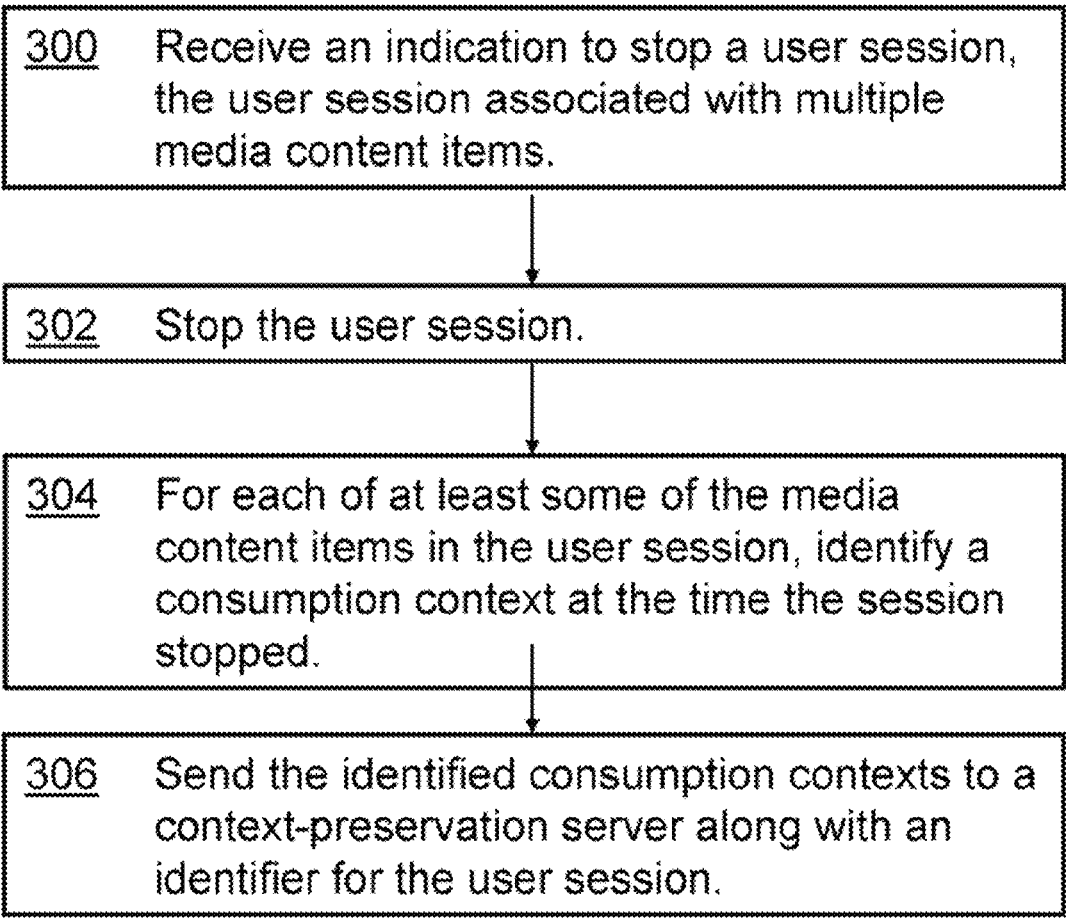
FIG. 3 is a flowchart of a representative method for preserving a consumption context for a user session.
Figure 4:
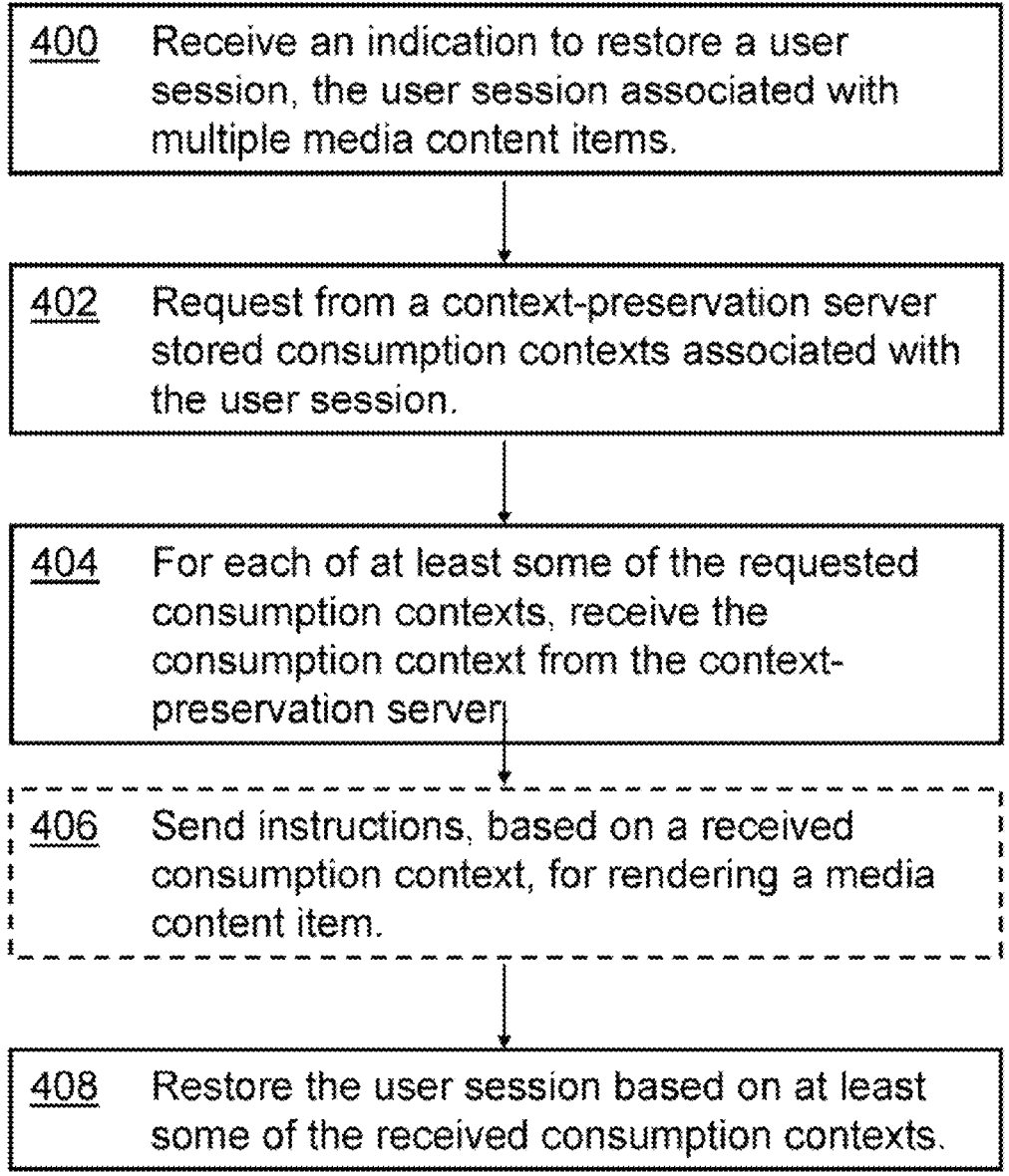
FIG. 4 is a flowchart of a representative method for restoring a consumption context for a user session.

In step 300 of FIG. 3, the user decides to stop the session. The companion-feeds server 106 is notified. Because the companion-feeds server 106 is aware of the primary and secondary streams (as it coordinates them), it is able to stop all of these streams in step 302. That is to say, the user's command is interpreted as a desire to stop the entire user session, not just one media stream within it.

The companion-feeds server 106, in step 304, identifies the consumption context of at least some of the streams in the user session. The contextual information may vary from stream to stream but can include an amount of the primary stream already viewed by the user when he stops the session and which secondary content items the user has already viewed (and possibly responded to). Context can also include parameters set by the user such as playback volume, video quality, playback language, closed-captioning settings, and the like. User-profile information can be recorded including preferences for arranging primary and secondary content displays and priority settings of one type of secondary content over another. If available, information about the user's specific viewing context can also be recorded such as who else was present, the physical location of the user, and the time of day.

As much of these types of information that can be gathered in step 304 are sent to, and stored by, a context-preservation server 108. In many embodiments, an identifier is assigned to this collection of information about the user session.

The context-preservation server 108 may be a stand-alone server, may be functionally embodied on the same device that embodies the companion-feeds server 106, or may even be on a user device.

At some later time, the user wishes to resume the paused session. In step 400 of FIG. 4, the companion-feeds server 106 receives an indication from the user. The indication may identify which session the user wishes to restart if he has paused more than one.

In steps 402 and 404, the information stored for this user session is retrieved by the companion-feeds server 106 from the context-preservation server 108. The companion-feeds server 106 restarts and coordinates the user session in step 408. (Optional step 406 is discussed below.)

Restarting a session may involve much more than simply starting the primary and second streams where the user left off when the session stopped. For example, the user's environment may have changed significantly in the interim. The user may have halted the session while at home but restarted it in a location where he only has access to his smartphone 110. The display of the primary and secondary streams must clearly be altered to fit the smaller amount of display space available to the user. Also, the new user location may support a different digital-rights regime that makes some content in the original streams unavailable or makes new content available. The companion-feeds server 106 may be able to account for this by reforming the secondary streams in a manner relevant to the user and appropriate for the new circumstances.

As another example, the baseball game that the user was watching live before pausing the session is now history. The companion-feeds server 106 can take advantage of this to block comments that give away the outcome of the game. Again, social-networking feeds can be reviewed to see what portions of the game were the most exciting, and the user can be alerted to this, even without giving away exactly what happened.

For a final example, the social context of the user may have changed. The number and composition of the people around the user may alter which secondary streams are now appropriate. User-profile information may be useful in deciding which secondary feeds to show.

To accommodate these and other changes, the companion-feeds server 106 can intelligently choose content to display (rather than simply resuming the paused secondary streams), and may even, in step 406, send explicit instructions to the user device 110 on how to render specific content items. As mentioned above, portions of the primary stream may be known to be, based on social-networking feeds, more interesting than others and may be highlighted in some way (visually or audibly, for example). Similarly, if certain secondary content items have received a lackluster response from others, they may be de-emphasized when the session is resumed.

Figure 5:
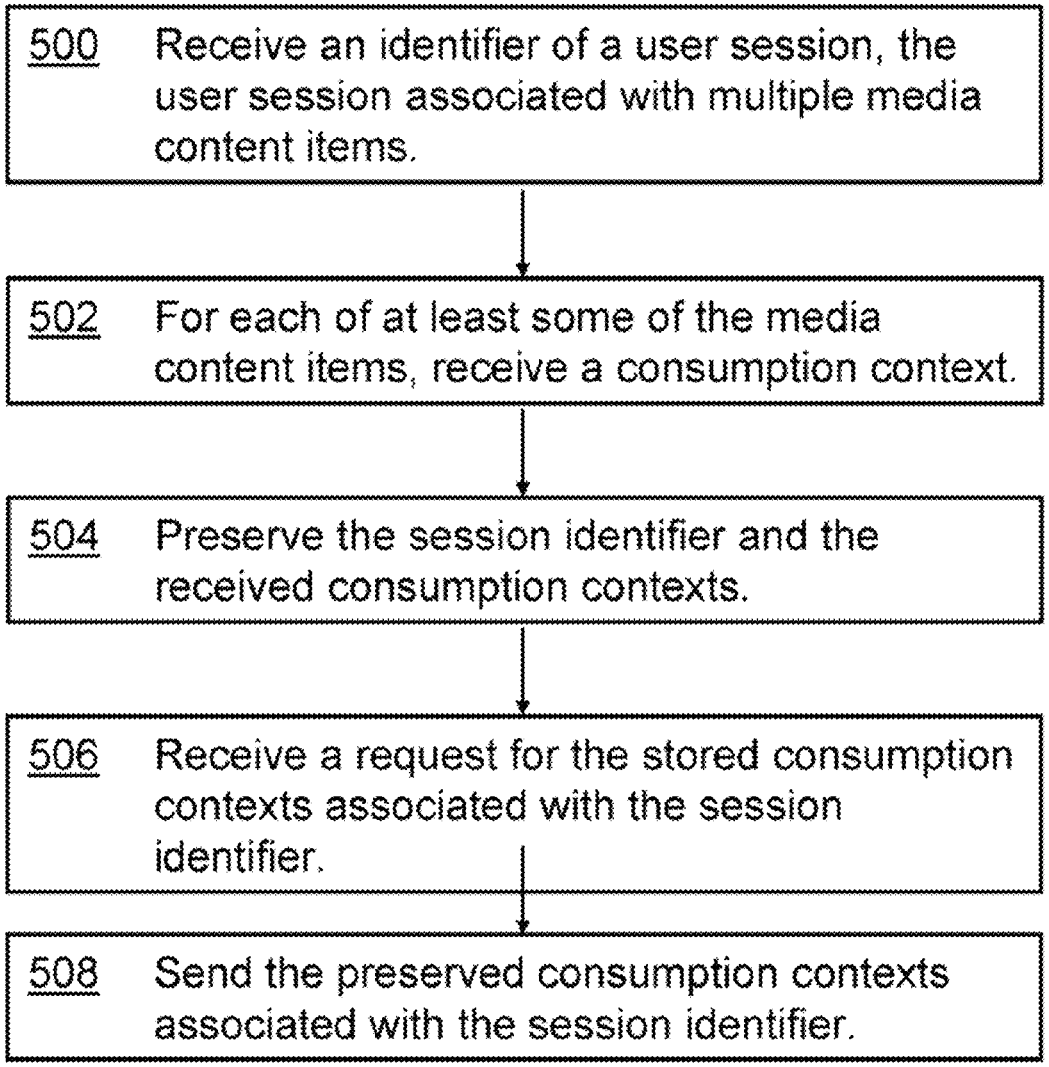
FIG. 5 is a flowchart of a representative method for a context-preservation server to preserve and restore a consumption context for a user session.

For completeness' sake, FIG. 5 presents the user-session preservation and resumption from the vantage point of the context-preservation server 108. In step 500, a session identifier is received. This may identify the user, when the session stopped, and other session metadata.

Consumption context for the session is received in step 502 and stored in step 504. Note that in general, it is not expected that actual media content items are stored here. Instead, the context-preservation server 108 stores information about the items in the primary and secondary content streams (e.g., pointers, elapsed-time indicators, URLs where the content items may be found) as well as general context information and, possibly, user preferences and profile information.

When the user wishes to resume the session, a request is received by the context-preservation server 108 in step 506. Although not depicted in FIG. 5, known techniques of authentication and verification can be applied here to ensure that only appropriate people can restart the session. The request is complied with in step 508 when the preserved context is delivered to the requesting companion-feeds server 106.

Figure 6:
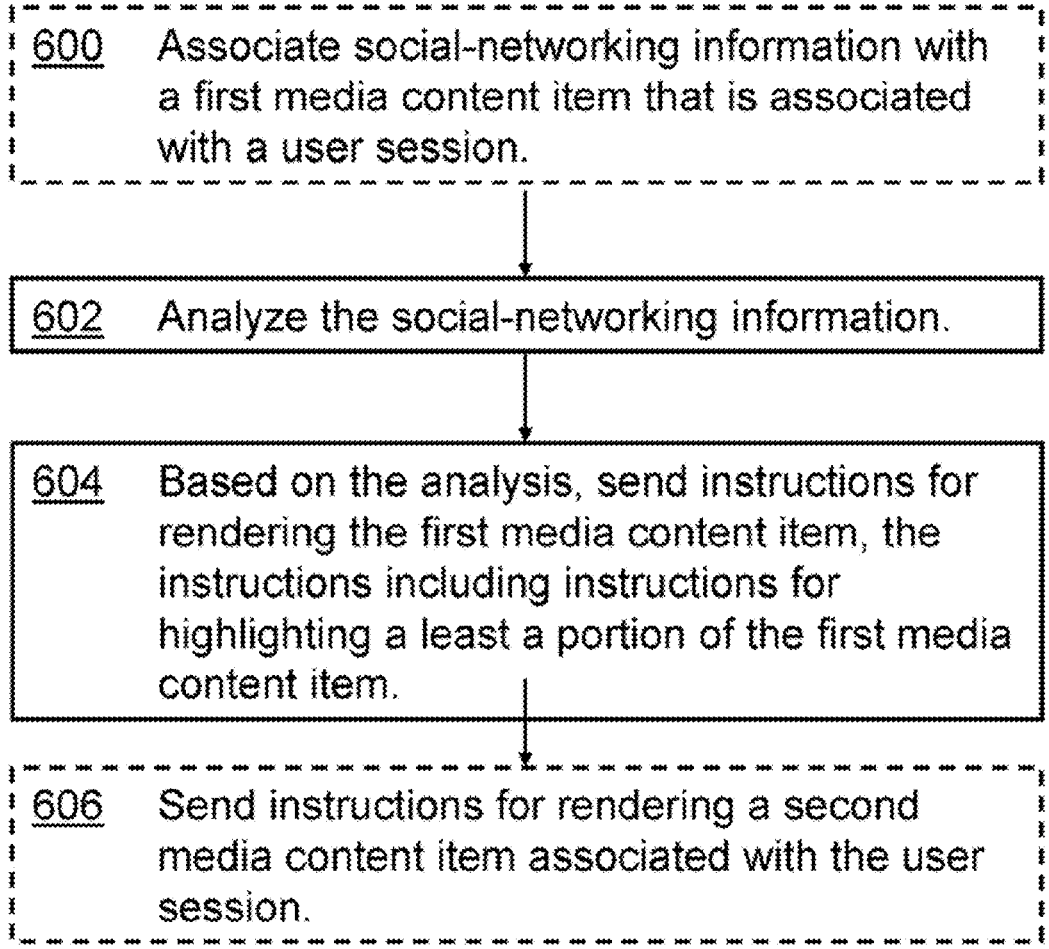
FIG. 6 is a flowchart of a representative method for coordinating a user session.

The method of FIG. 6 shows that some of the above techniques can be applied even when, strictly speaking, a user session is not being resumed. Social-networking information (e.g., viewer posts and ratings) are associated with a content item in step 600. (This step is marked as optional in FIG. 6 because a device other than, or in addition to, the companion-feeds server 106 may perform the associating.) This information is analyzed in step 602. For example, viewers can comment on which scenes of a movie they found to be compelling. Automated systems can review a recorded game and note which parts are more exciting.

When a user session is started that includes the particular content item reviewed in step 600, the companion-feeds server 106, noting the social-networking information generated about this content item, can use that information in step 604 to instruct the user's playback device to render the content item in a particular way. For example, exciting scenes can be highlighted, while boring scenes are de-emphasized, fast-forwarded through, or even skipped entirely.

When making a decision how to (or whether to) highlight a portion of a media content item, the companion-feeds server 106 can consult other information available to it, such as user-set values, user preferences and priorities, and the current user context including social-presence information.

In step 606, the companion-feeds server 106 optionally highlights a second media content item in the user session. For example, a particular social-networking item deemed to be relevant to the user's viewing of the primary content item may be important enough to highlight in its own right.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for a companion-feeds server to coordinate a user session, the method comprising:

analyzing, by the companion-feeds server, social-networking feed information associated with a first media content item to identify portions of the first media content item likely to be of interest to a viewer of the first media content item, the social-networking feed information comprising viewer posts and ratings, wherein the first media content item is a movie, a television program, or video content item;

sending, by the companion-feeds server to a first content-consumption device of the viewer during the user session, wherein the user session is associated with the first media content item, instructions for rendering the identified portions of the first media content item likely to be of interest to the viewer of the first media content item based on the analyzed social-networking feed information, the instructions for rendering the identified portions comprising instructions for visually highlighting the identified portions of the first media content item; and sending, during the user session, by the companion-feeds server to a second content-consumption device of the viewer distinct from the first content-consumption device, social-networking feed information likely to be of interest to the viewer based on user profile information of the viewer and associated with the identified portions of the first media content item and synchronized to the identified portions of the first media content item wherein communication of social-networking feed information to the second content-consumption device is paused when the instructions for rendering the identified portions of the first media content item on the first content-consumption device are paused during the user session, and communication of social-networking feed information to the second content-consumption device is resumed when the instructions for rendering the identified portions of the first media content item on the second content-consumption device are resumed during the user session.

2. The method of claim 1 wherein the instructions for rendering the first media content item are based, at least in part, on an element selected from a group consisting of: a current context of a user of the first content-consumption device, an explicit setting by the user of a parameter, a profile of the user, a preference set by the user, a priority associated with a media content item, and social-presence information.

3. The method of claim 1 wherein the instructions for rendering the first media content item are based, at least in part, on an explicit setting by the user of a parameter, wherein the user-set parameter is selected from a group consisting of: video quality, language track, a closed-captioning option, an audio mode, and a volume setting.

4. The method of claim 1 further comprising:
associating, by the companion-feeds server, the social-networking feed information with the portions of the first media content item.

5. The method of claim 1 wherein the companion-feeds server is selected from a group consisting of: a set-top box, a personal communications device, a television, a mobile telephone, a personal digital assistant, a personal computer, a tablet computer, a gaming console, a media-restreaming device, a head-end server, a server, and a plurality of servers.

6. The method of claim 1 wherein analyzing further comprises analyzing viewers' comments in the social-networking feed.

7. The method of claim 1 wherein analyzing social-networking feed information further comprises using user-set values, user preferences and priorities, and a current user context including social-presence information to identify portions of the first media content item likely to be of interest to the viewer of the first media content item.

8. The method of claim 1, further comprising analyzing, by the companion-feeds server, the first media content item for topics likely to be of interest to the viewer of the first media content item.

9. A companion-feeds server configured for coordinating a user session, the companion-feeds server comprising:
a communications interface; and
a processor operatively connected to the communications interface and configured for:
analyzing social-networking feed information associated with a first media content item to identify portions of the first media content item likely to be of interest to a viewer of the first media content item, the social-networking feed information comprising viewer posts and ratings, wherein the first media content item is a movie, a television program, or video content item;

sending, via the communications interface to a first content-consumption device used by the viewer during the user session, the user session associated with the first media content item, instructions for rendering the identified portions of the first media content item likely to be of interest to the viewer of the first media content item based on the analyzed social-networking feed information, the instructions for rendering the identified portions comprising instructions for visually highlighting the identified portions of the first media content item; and sending, during the user session, by the companion-feeds server to a second content-consumption device used by the viewer, wherein the second content-consumption device is a different device than the first content-consumption device, social-networking feed information likely to be of interest to the viewer based on user profile information of the viewer, the social-networking feed information associated with the identified portions of the first media content item and synchronized to the identified portions of the first media content item wherein communication of social-networking feed information to the second content-consumption device is paused when the instructions for rendering the identified portions of the first media content item on the first content-consumption device are paused during the user session and communication of social-networking feed information to the second content-consumption device is resumed when the instructions for rendering the identified portions of the first media content item on the first content-consumption device are resumed during the user session.

10. The companion-feeds server of claim 9 wherein the companion-feeds server is selected from a group consisting of: a set-top box, a personal communications device, a television, a mobile telephone, a personal digital assistant, a personal computer, a tablet computer, a gaming console, a media-restreaming device, a head-end server, a server, and a plurality of servers.

11. The companion feeds server of claim 9 wherein analyzing further comprises analyzing viewers' comments in the social-networking feed.

12. The companion feeds server of claim 9 wherein the instructions for rendering the first media content item are based, at least in part, on an element selected from a group consisting of: a current context of a user of the first content-consumption device, an explicit setting by the user of a parameter, a profile of the user, a preference set by the user, a priority associated with a media content item, and social-presence information.

13. The companion feeds server of claim 9 wherein the instructions for rendering the first media content item are based, at least in part, on an explicit setting by the user of a parameter, wherein the user-set parameter is selected from a group consisting of: video quality, language track, a closed-captioning option, an audio mode, and a volume setting.

14. The companion feeds server of claim 9 wherein analyzing social-networking feed information further comprises using user-set values, user preferences and priorities, and a current user context including social-presence information to identify portions of the first media content item likely to be of interest to the viewer of the first media content item.

15. The companion feeds server of claim 9 further comprising analyzing, by the companion-feeds server, the first media content item for topics likely to be of interest to the viewer of the first media content item.

16. A non-transitory computer-readable medium, comprising instructions encoded in one or more tangible media for execution by one or more processors to provide a media content item viewing session, the instructions when executed operable by the one or more processors to perform operations, comprising:

associate social-networking feed information with a first media content item the social-networking feed information comprising viewer posts and ratings;

based on the associated social-networking feed information, identify portions of the first media content item likely to be of interest to a viewer of the first media content item;

send to a primary device of the viewer, during the media content item viewing session, the portions of the first media content item identified as likely to be of interest to the viewer of the first media content item based on the associated social-networking feed information by visually highlighting the portions identified as likely to be of interest to the viewer; and send, during the media content item viewing session, to a companion device of the viewer different from the primary device of the viewer, social-networking feed information associated with the portions of the first media content item and selected based on a user profile of the viewer; and wherein sending the social-networking feed information to the companion device is synchronized to sending the portions of the first media content item to the primary device wherein the sending of the social-networking feed information to the companion device is paused when the viewer pauses the sending of the portions of the first media content item to the primary device and is resumed when the viewer resumes the sending of the portions of the first media content item to the primary device.

17. The non-transitory computer-readable medium of claim 16, wherein the instructions are further operable to analyze viewers' comments in the social-networking feed.

18. The non-transitory computer-readable medium of claim 16, wherein the instructions are further operable to analyze the first media content item for topics likely to be of interest to the viewer.

* * * * *